July 16, 1935. E. A. WICK 2,008,530
SUBMARINE GLASSES
Filed June 25, 1932

Emil Ager Wick
Inventor.

Patented July 16, 1935

2,008,530

UNITED STATES PATENT OFFICE 2,008,530

SUBMARINE GLASSES

Emil Ager Wick, Brooklyn, N. Y., assignor of one-half to Magnus Bjorndal, Jersey City, N. J.

Application June 25, 1932, Serial No. 619,229

5 Claims. (Cl. 88—54)

My invention relates to an improvement in lenses which enable the human eye to see clearly under water. It is well known that the lenses of the human eye are filled with a watery solution having very nearly the same coefficient of refraction as water. When therefore the human eye is submerged in water a ray of light passing from the water into the eye is not deflected at all due to the similarity of coefficients of refraction. This means that the eye is entirely out of focus and can only perceive a very small fraction of the rays entering and for this reason human beings can see only very poorly when submerged in water. The purpose of my invention is, therefore, to replace the lenses made ineffective by the submersion in water and thus enable a person to see equally as well in water as in the air. My invention will therefore be of great use to swimmers, divers, life guards and others who at times have to be entirely submerged in water.

Another selfevident object of my invention is to provide a pair of eyeglasses for subaqueous use which will float and can thus not easily become lost.

The formula for the focal length of a symmetrical double convex glass lens is $f=r$ where $f$ is the focal length and $r$ the radius of the lens. Due to the difference in coefficients of refraction of air and water, the same glass lens above submerged in water would give a focal length of four times the radius which may be expressed in the formula $f=4r$. It is thus evident that a lens could be made of glass to replace the lenses of the eye when under water, but this lens would have only one fourth the radius of a similar lens in air. This would make an extremely strong lens through which it would, of course, be entirely impossible to see in the air. Glass is therefore out of the question as a material for these lenses. Now, as mentioned above, the purpose of my invention is to enable a person to see equally as well in water as in air without putting on any special contraptions in changing from one medium to another. To obtain this I have found that a lens made from thin transparent celluloid, or other similar material, filled with air, as shown in the drawing, completely answers my purpose. Due, however, to the fact that the optical density of air is smaller than the optical density of the surrounding water the refraction of a ray of light passing from water to air to water is exactly the opposite of the refraction of a water lens in air. While thus in air a water or glass lens would have to be convex to focus the light on a certain point, in water an air lens must necessarily be concave to obtain the same condition. Due to the thinness of the celluloid forming the lens and due to the fact that a light ray has to pass through two consecutive layers of the material this covering has no appreciable effect on the efficiency of the lens. What I have, therefore, is a lens of air surrounded by water. For this condition the general lens formula reduces to the expression $f=1.5r$.

Referring to the drawing, Fig. 1 shows a front view of a pair of glasses embodying my invention.

Figure 1:
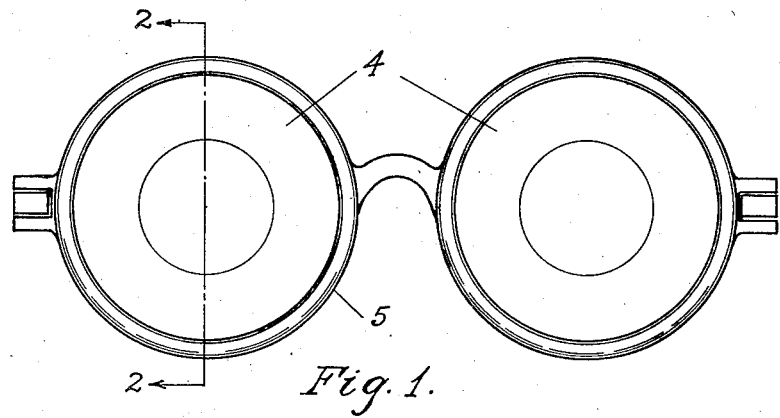

In Fig. 1 is shown the lenses 4 held in a pair of regular spectacle frames 5. In case of a person who regularly wears glasses the lenses 4 may also be adapted to be clipped directly on the regular glasses.

Figure 2:
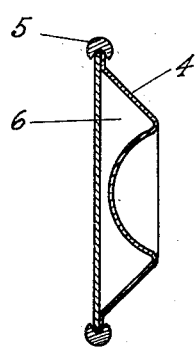
Fig. 2 represents a section taken along the line 2—2 of Fig. 1.

In Fig. 2 is shown a section of the lens 4 with frame 5 and airfilled space 6. Instead of air any other transparent gas having approximately the coefficient of refraction of air may be used. The lens shown in Fig. 2 is plane concave.

Figure 3:
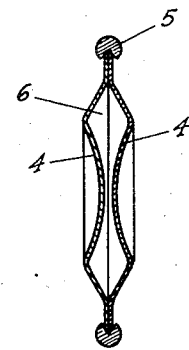
Fig. 3 shows the same section as Fig. 2 but with a double concave lens.

In Fig. 3 is shown a section through a double concave lens designed on the same principle as above.

The operation of my invention is based on the simple fact, as explained above, that the lenses described are no lenses at all in air while in water they are strongly focusing enabling a person wearing them to see equally well in water as above. The same result may, of course, be obtained in other ways by using other transparent materials for lens covering and other gases as a filler without deviating from the principle of the present invention. However, none such combinations have been found to be as effective optically and as simple to manufacture as my preferred construction as shown in the drawing.

Having thus described my invention what I claim is:

1. Submarine eyeglasses of the character described consisting of a combination of two transparent concavely formed lenses in a common frame, said lenses being shells of transparent material filled with a gaseous substance of the lowest possible coefficient of refraction.

2. Combination eyeglasses for air and subaqueous use characterized by two concavely formed lenses in a common frame, said lenses being shells of transparent material filled with air and sealed.

3. In submarine glasses of the character described the combination of a common frame, a double-walled concave lens of transparent material, a gaseous filling in said lens of a coefficient of refraction nearly that of air, whereby said glasses will be light enough to float on the water.

4. In submarine glasses of the character described the combination of a common frame, two double-walled concave lenses of transparent material, a gaseous filling in said lenses of a coefficient of refraction nearly that of air, whereby said glasses will be light enough to float on the water.

5. In submarine glasses of the character described the combination of a common frame, two double-walled concave lenses of transparent material, a gaseous filling in said lenses of a coefficient of refraction equal to that of air, whereby said glasses will be light enough to float on the water.

EMIL AGER WICK.